US008189810B2

(12) United States Patent
Wolff et al.

(10) Patent No.: US 8,189,810 B2
(45) Date of Patent: May 29, 2012

(54) SYSTEM FOR PROCESSING MICROPHONE SIGNALS TO PROVIDE AN OUTPUT SIGNAL WITH REDUCED INTERFERENCE

(75) Inventors: Tobias Wolff, Ulm (DE); Markus Buck, Biberach (DE)

(73) Assignee: Nuance Communications, Inc., Burlington, MA (US)

( * ) Notice: Subject to any disclaimer, the term of this patent is extended or adjusted under 35 U.S.C. 154(b) by 990 days.

(21) Appl. No.: 12/125,298

(22) Filed: May 22, 2008

(65) Prior Publication Data

US 2008/0298602 A1    Dec. 4, 2008

(30) Foreign Application Priority Data

May 22, 2007 (EP) ..................... 07010160

(51) Int. Cl.
*H04B 15/00* (2006.01)
(52) U.S. Cl. .......... 381/94.1; 381/66; 381/94.7; 381/92; 379/406.01; 379/406.08
(58) Field of Classification Search .............. 381/66, 381/83, 93, 95; 379/406.01, 406.16; 370/286–292
See application file for complete search history.

(56) References Cited

U.S. PATENT DOCUMENTS

| | | | |
|---|---|---|---|
| 6,049,607 A | 4/2000 | Marash et al. ............... 379/410 |
| 6,137,881 A * | 10/2000 | Oh et al. ................. 379/406.08 |
| 6,421,377 B1 | 7/2002 | Langberg et al. ............ 375/222 |
| 6,442,275 B1 | 8/2002 | Diethorn ................. 379/406.14 |
| 6,510,225 B1 | 1/2003 | Robertson et al. ......... 379/406.1 |
| 6,738,480 B1 | 5/2004 | Berthault et al. ............. 381/66 |
| 6,839,426 B1 | 1/2005 | Kamoi et al. ............ 379/406.01 |
| 6,895,095 B1 | 5/2005 | Thomas ...................... 381/94.7 |
| 2002/0176585 A1 | 11/2002 | Egelmeers et al. ........ 381/71.11 |
| 2003/0021389 A1 | 1/2003 | Hirai et al. ........................ 379/3 |
| 2003/0091182 A1 | 5/2003 | Marchok et al. ......... 379/392.01 |
| 2003/0185402 A1 | 10/2003 | Benesty et al. ................ 381/66 |
| 2004/0018860 A1 | 1/2004 | Hoshuyama ............... 455/569.1 |
| 2004/0125942 A1 | 7/2004 | Beaucoup et al. ........ 379/406.01 |
| 2005/0213747 A1 | 9/2005 | Popovich et al. ........ 379/406.03 |

(Continued)

FOREIGN PATENT DOCUMENTS

EP    1 404 147 A2    3/2004

(Continued)

OTHER PUBLICATIONS

Herbordt et al (Computationally efficient frequency-domain combination of acoustic echo cancellation and robust adaptive beamforming (2001).*

(Continued)

*Primary Examiner* — Matthew Landau
*Assistant Examiner* — Khaja Ahmad
(74) *Attorney, Agent, or Firm* — Sunstein Kann Murphy & Timbers LLP (57) ABSTRACT

A system reduces noise or other external signals that may affect communication. A device converts sound from two or more microphones into an operational signal. Based on one or both signals, a beamformer generates an intermediate signal. Reflected or other undesired signals may be estimated or measured by an echo canceller. Interference may be measured or estimated by processing the echo-reduced signal or estimate by a blocking matrix. An interference canceller may reduce the interference that may modify or disrupt a signal based on the output of the blocking matrix and the intermediate signal.

23 Claims, 7 Drawing Sheets

U.S. PATENT DOCUMENTS

| | | | |
|---|---|---|---|
| 2006/0018459 A1 | 1/2006 | McCree | 379/406.06 |
| 2006/0062380 A1 | 3/2006 | Kim et al. | 379/406.01 |
| 2006/0067518 A1 | 3/2006 | Klinke et al. | 379/406.01 |
| 2006/0233353 A1 | 10/2006 | Beaucoup et al. | 379/406.01 |
| 2007/0076900 A1* | 4/2007 | Kellermann et al. | 381/92 |
| 2007/0093714 A1 | 4/2007 | Beaucoup | 600/437 |

FOREIGN PATENT DOCUMENTS

| | | |
|---|---|---|
| EP | 1 406 397 A1 | 4/2004 |
| EP | 1633121 A1 | 3/2006 |
| WO | WO 93/17510 | 9/1993 |

OTHER PUBLICATIONS

Walter et al (Integrating Acoustic Echo Cancellation with Adaptive Beamforming Microphone Arrays (1999).*

Gänsler, et al. "An Adaptive Nonlinearity Solution to the Uniqueness Problem of Stereophonic Echo Cancellation," *IEEE*, Murray Hill, New Jersey, pp. 1885-1888, 2002.

Schmidt, et al. "Signal Processing for In-Car Communication Systems," *Elsevier*, pp. 1307-1326, 2005.

Benesty, et al. "A Hybrid Mono/Stereo Acoustic Echo Canceler," *IEEE Transactions on Speech and Audio Processing*, vol. 6, No. 5, pp. 468-475, Sep. 1988.

Kuo, et al. "Acoustic Noise and Echo Cancellation Microphone System for Videoconferencing," *IEEE Transactions on Consumer Electronics*, No. 4, pp. 1150-1158, Nov. 1995.

Sondhi, et al. "Adaptive Echo Cancellation for Speech Signals," pp. 327-356, 1991.

Storn, R. "Echo Cancellation Techniques for Multimedia Applications—a Survey," pp. 1-53, Nov. 1996.

Brandstein et al "Microphone Arrays: Signal Processing Techniques and Applications," Springer Verlag, 2001, 107 pages.

Dal Degan et al "Acoustic Noise Analysis and Speech Enhancement Techniques for Mobile Radio Applications," *Signal Processing*, 1988, vol. 15,Elsevier Science Publishers B.V. (North Holland), pp. 43-56.

Griffiths "An Alternative Approach to Linearly Constrained Adaptive Beamforming," *IEEE Transactions on Antennas and Propagation*, Jan. 1982, vol.AP—30, No. 1, pp. 27-34.

Hoshuyama, et al "A Robust Adaptive Beamformer for Microphone Arrays with a Blocking Matrix Using Constrained Adaptive Filters," *IEEE Transactions on Signal Processing*, Oct. 1999, vol. 47, No. 10, pp. 2677-2684.

Hänsler et al "Acoustic Echo and Noise Control: A Practical Approach," Wiley-Interscience, IEEE Press, 2004, pp. cover-xxvi, 77-78, 289-292 (33 pages total).

Herbordt et al "Joint Optimization of LCMV Beamforming and Acoustic Echo Cancellation for Automatic Speech Recognition," *Proc. IEEE Int. Conf. Acoust., Speech, Signal Processing ICASSP-05*, May 2005, vol. 3, pp. 77-80.

* cited by examiner

SYSTEM FOR PROCESSING MICROPHONE SIGNALS TO PROVIDE AN OUTPUT SIGNAL WITH REDUCED INTERFERENCE

PRIORITY CLAIM

This application claims the benefit of priority from European Patent Application No. 07010160.5, filed May 22, 2007, which is incorporated by reference.

BACKGROUND OF THE INVENTION

1. Technical Field

The inventions relate to noise interference detection and reduction, and in particular, to echo source detection and reduction.

2. Related Art

Microphones may detect and convert received sound into electrical signal. Microphones may detect desired sound, such as speech, music, or other audio. Microphones may also detect interference, such as echoes and speech from other speakers, which may mask or distort the desired sound. The interference may be produced by loudspeakers, reflections off surfaces, or other sources.

Interference may be reduced through a generalized sidelobe canceller. A generalized sidelobe canceller may include process branches that generate a reduced interference signal and a blocking signal that includes interfering components. An interference canceller may subtract portions of the blocking signal from the reduced interference signal to produce an output. However, this technique may attenuate a desired signal. In addition, interference such as echo sounds may be detected as desired signals and distort the output signal. This technique may cause undesirable and unacceptable output signals.

SUMMARY

A system reduces noise or other external signals that may affect communication. A device converts sound from two or more microphones into an operational signal. Based on one or both signals, a beamformer generates an intermediate signal. Reflected or other undesired signals may be estimated or measured by an echo canceller. Interference may be measured or estimated by processing the echo-reduced signal or estimate by a blocking matrix. An interference canceller may reduce the interference that may modify or disrupt a signal based on the output of the blocking matrix and the intermediate signal.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A system processes two or more sound waves while eliminating unwanted or undesired signals. Operational or microphone signals may include desired content and reflected interference. A signal processing system such as a beamformer may receive and process the signals. The intermediate signal output may be further processed to generate an echo-reduced signal. A blocking matrix and/or interference canceller may eliminate or dampen the unwanted signals while leaving the desired content substantially intact.

In some systems, a plurality of echo source signals may be added by an echo canceller to generate an estimate. The echo signal estimate may be further processed or subtracted from an intermediate signal to generate an echo-reduced signal. Some echo cancellers include adaptive filters. The adaptive filters may adjust or filter the echo source signals and add components of the filtered echo source signals together to generate the echo signal estimate. The blocking matrix may also include adaptive filters. These filters may selectively pass certain elements of the echo-reduced signal and subtract the filtered echo-reduced signal from the microphone signals. The output may comprise the interference signal.

Adaptive filters within the interference canceller may selectively pass certain elements of the interference signal and subtract the filtered interference signal from the intermediate signal to generate the output signal. The output signal may be based on the echo source signal. A voice activity detector may control activation of the beamformer, echo canceller, blocking matrix, and interference canceller based on a noise component estimate of the microphone signals and the echo-reduced signal.

Figure 1:
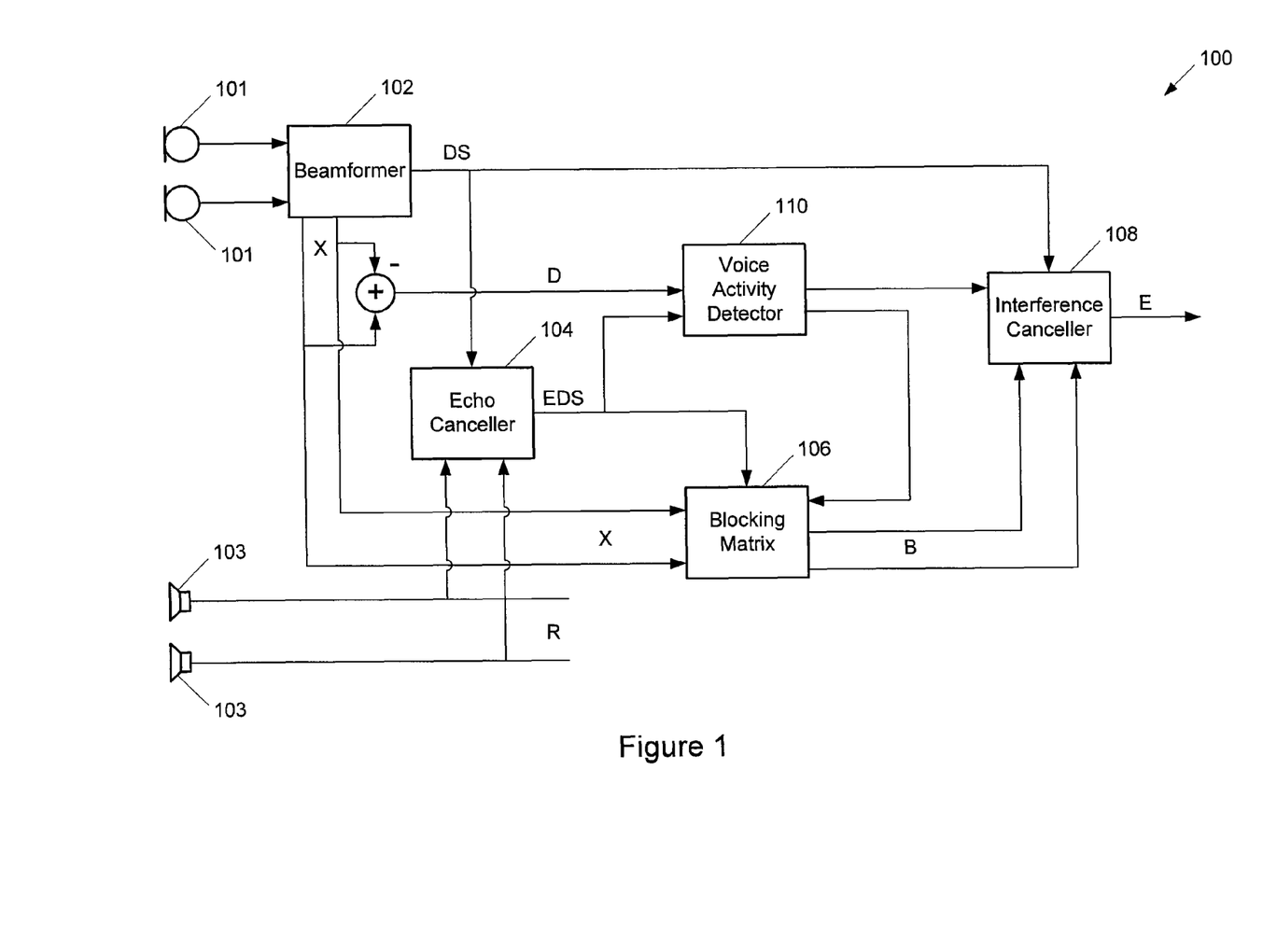
FIG. 1 is a microphone processing system.

FIG. 1 is a microphone processing system 100. The system 100 receives a plurality of microphone signals and generates an output signal E with less interference than the unprocessed signals. The noise or other external signals that may affect the microphone signals may include echo signals and noise signals. An echo signal may be transmitted from loudspeakers 103 in a hands-free telephone system and a noise signal may include vehicle and/or environmental noises. In some applications, an echo signal may be known because an echo source signal R may drive the loudspeakers 103. An echo-reduced signal or EDS may be generated by a subtractor that subtracts the echo source signal R from the received microphone signals X. The echo-reduced signal EDS may produce an interference signal B. The interference signal may be used to cancel the interference in the received microphone signals to produce an output signal E. The output signal E may dampen the noise or other undesired signals through the use of the echo-reduced signal EDS.

A plurality of microphones 101 may receive a sound signal. The received sound signal may include a desired signal component, such as voice signals from a human speaker, and an echo signal component, such as echo signals linked to loudspeakers 103. A beamformer 102 may receive the sound signals from the microphones 101 and delay the signals to account for distances between the microphones 101 and the source of the desired signal. The receiving sensitivity in the direction of the desired signal source may be increased through use of the beamformer 102. The beamformer 102 may generate an intermediate signal DS that has an improved signal-to-noise ratio of the desired signal compared to the received microphone signals. Some or all of the microphones 101 may generate the intermediate signal DS. In addition, the microphones 101 may be positioned or adapted in an array to emphasize the desired signal component within the intermediate signal DS. Each output of the microphones 101 may be weighted differently to achieve a desired sensitivity pattern. Some or all of the microphones 101 may be used in the beamformer 102.

An echo canceller 104 receives the intermediate signal DS and the echo source signals R. The echo source signals R may be known signals that may include electrical signals driving the loudspeakers 103, for example. The echo source signals R may originate from other sources of echo signals. An echo-reduced signal EDS may be generated by the echo canceller 104 that may process the intermediate signal DS and the echo source signals R. In some systems, the echo-reduced signal EDS may be a difference between the intermediate signal DS and the echo source signals R. In these systems, the echo-reduced signal EDS may exclude known echo source signals R. By using the echo-reduced signal EDS, the interference signal B may be improved. Furthermore, the known echo source signals R may not be processed by a blocking matrix 106 in some systems.

The blocking matrix 106 may generate the interference signal B based on the microphone signals X and the echo-reduced signal EDS. The interference signal B generated by the blocking matrix 106 may include suppression of the echo-reduced signal EDS from the microphone signals X. The interference signal B may include undesired interference components, such as echo signal components and noise components. The blocking matrix 106 may or may not adapt to different environments. An interference canceller 108 may use the interference signal B to cancel the interference components from the intermediate signal DS to generate the output signal E.

A voice activity detector 110 may receive the echo-reduced signal EDS and a noise component estimate D that is based on the difference between the microphone signals X. The voice activity detector 110 may control activation of one or more of the beamformer 102, the echo canceller 104, the blocking matrix 106, and/or the interference canceller 108 such that the components are activated when a desired signal is detected. For example, the voice activity detector 110 may indicate the presence of speech as well as the beginning and end of speech segments. The voice activity detector 110 may improve the quality of the output signal E by activating the system only when desired signals are processed.

In particular, the voice activity detector 110 may use the echo-reduced signal EDS to detect desired signal in a preferred direction of the beamformer 102. An alternative accurate detection of desired signal may be accomplished by processing the echo-reduced signal EDS instead of the received microphone signal or the intermediate signal DS. A comparison between a signal power of the echo-reduced signal EDS and a signal power of a noise component estimate may determine the presence of desired signal. A quotient $\tilde{M}(\Omega,k)$ of whether the desired signal is present may be written as:

$$\tilde{M}(\Omega, k) = \frac{S_{EDSEDS}(\Omega, k)}{S_{DD}(\Omega, k)}$$

where $\Omega$ is the normalized frequency and k is the discrete time. The quotient $\tilde{M}(\Omega,k)$ may be compared to a predetermined value to determine if the desired signal is present. If the quotient $\tilde{M}(\Omega,k)$ is greater than the predetermined value, then the desired signal is present and the voice activity detector 110 may control activation of one or more of the beamformer 102, the echo canceller 104, the blocking matrix 106, and/or the interference canceller 108. The predetermined value may be a constant or may vary with time, frequency, or other parameters. The voice activity detector 110 may include or be based on ITU G.729(b), GSM 06.32, TIA EVRC, 3 GPP RS 26.094, or other standards.

The system 100 may reduce the undesired attenuation of desired signal in the output signal E. In particular, because the blocking matrix 106 may not have to process the echo source signals R that have been removed in the echo-reduced signal EDS, the interference signal B may be enhanced such that the desired signal components are not substantially present. Since the desired signal components are not substantially present in the interference signal B, the undesirable attenuation of desired signal by the interference canceller 108 of the output signal E may be reduced.

Figure 2:
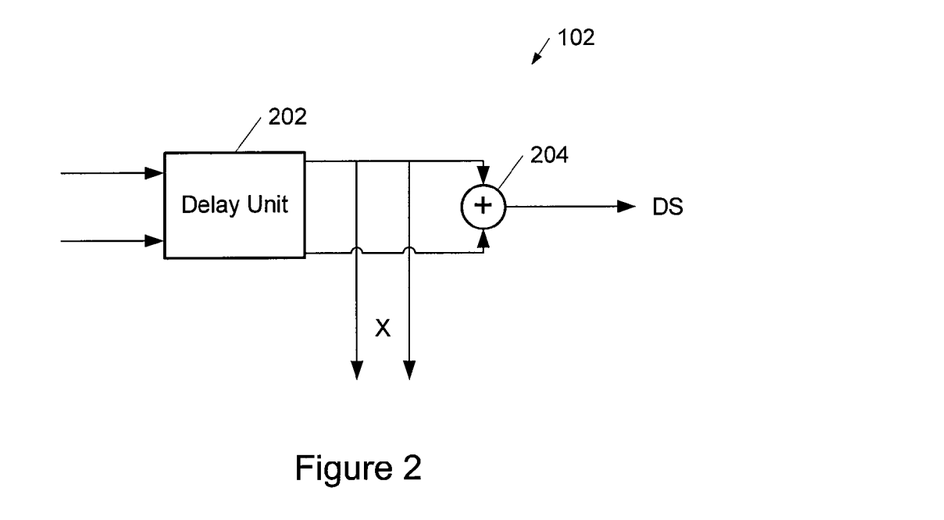
FIG. 2 is a beamformer in the microphone processing system.

FIG. 2 is the beamformer 102 in the microphone processing system 100. The beamformer 102 generates the intermediate signal DS based on the microphone signals received at the microphones 101. The beamformer 102 may include a delay unit 202 and an adder 204 to delay and sum the received microphone signals into the intermediate signal DS. The received microphone signals may be delayed by the delay unit 202 to compensate for the different distances the microphones 101 may be from the source of a desired signal. The microphone signals X that have been delayed may be processed by the beamformer 102 for use by the blocking matrix 106 and voice activity detector 110. The received microphone signals may also be filtered. The beamformer 102 may be a delay and sum beamformer, a linearly constrained minimum variance beamformer, or other types of beamformer. The beamformer 102 may or may not adapt to different environments.

Figure 3:
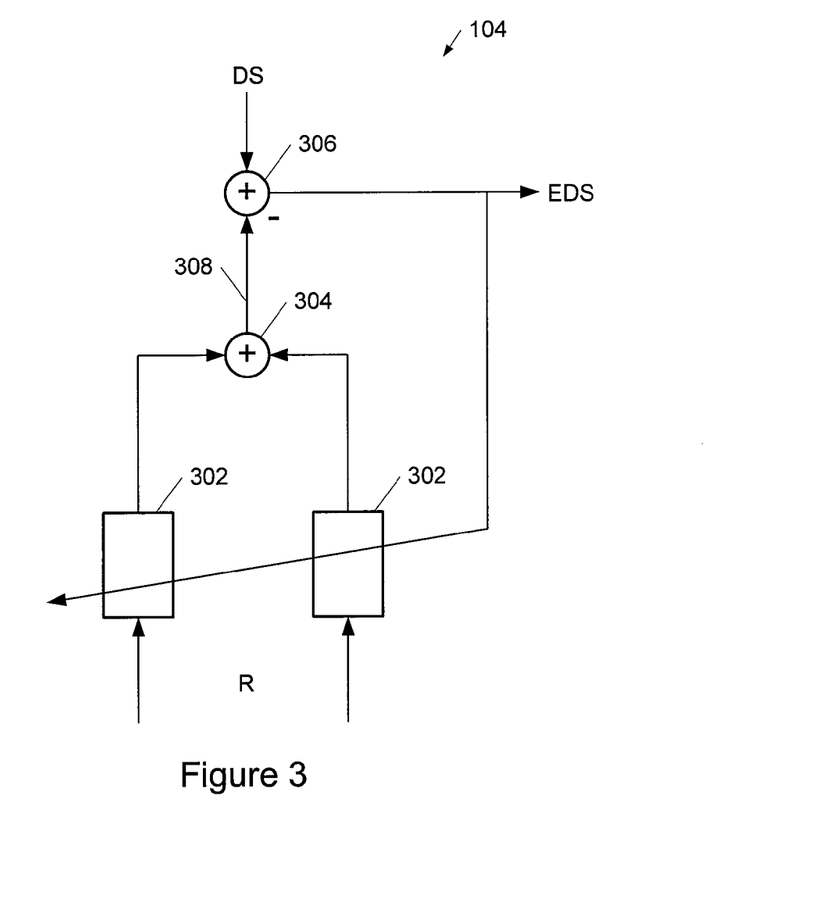
FIG. 3 is an echo canceller in the microphone processing system.

FIG. 3 is the echo canceller 104 in the microphone processing system 100. The echo canceller 104 generates the echo-reduced signal EDS based on the intermediate signal DS from the beamformer 102 and the echo source signals R. The echo source signals R may be electrical signals that drive the loudspeakers 103, for example. Adaptive filters 302 may filter the echo source signals R to minimize the echo source signals R in the echo-reduced signal EDS. The outputs of the adaptive filters 302 may be summed by an adder 304 to generate an echo signal estimate 308 that approximates the echo source signals R. The echo signal estimate 308 may be subtracted from the intermediate signal DS by an adder 306 to produce the echo-reduced signal EDS.

Through the filters 302, the echo source signals R may be processed. The echo signal estimate 308 may then be subtracted from the intermediate signal DS. The filters 302 may include finite impulse response filters, infinite impulse response filters, or other types of filters. The filtering may occur in the time domain or frequency domain. The adaptive filters 302 may adapt their filtering based on the echo-reduced signal EDS when filtering the echo source signals R. Alternatively, the echo source signals R are not filtered before summing at the adder 304. The individual echo source signals R may be weighted to emphasize a certain echo source if desired.

Figure 4:
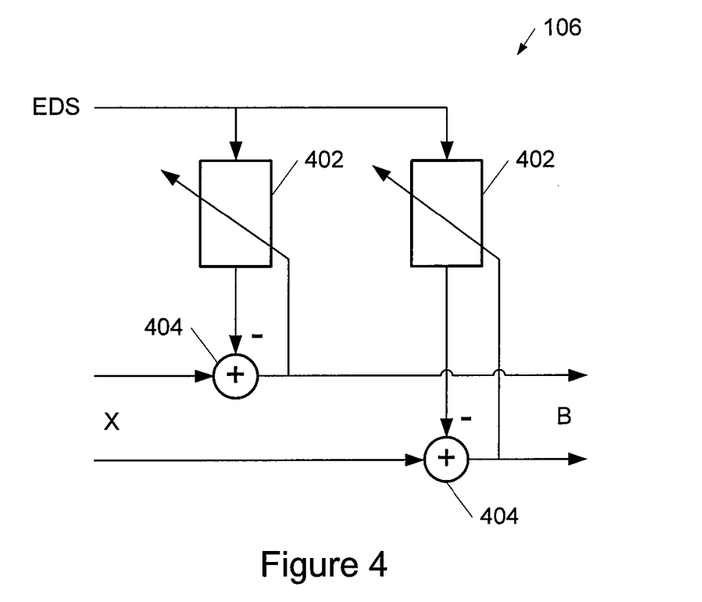
FIG. 4 is a blocking matrix in the microphone processing system.

FIG. 4 is a blocking matrix 106 in the microphone processing system 100. The blocking matrix 106 generates the interference signal B based on the echo-reduced signal EDS and the microphone signals X. Adaptive filters 402 may filter the echo-reduced signal EDS to minimize the echo-reduced signal EDS in the interference signal B. The outputs of the adaptive filters 402 may be subtracted from the microphone signals X by adders 404 to generate the interference signal B. The interference signal B may substantially exclude the echo-reduced signal EDS from the microphone signal X. The interference canceller 108 may then use the interference signal B to remove unwanted components from the received microphone signals.

The echo-reduced signal EDS may be filtered and subtracted separately for each of the microphone signals X. The filters 402 may include finite impulse response filters, infinite impulse response filters, coefficient-constrained adaptive filters, or other types of filters. The filtering may take place in the time domain or frequency domain. The adaptive filters 402 may adapt their filtering based on the interference signal B when filtering the echo-reduced signal EDS. In alternative systems, the echo-reduced signal EDS is not filtered before being subtracted by adders 404. In each system, the echo-reduced signal may be weighted to further reduce the influence of echo on the resulting output.

Figure 5:
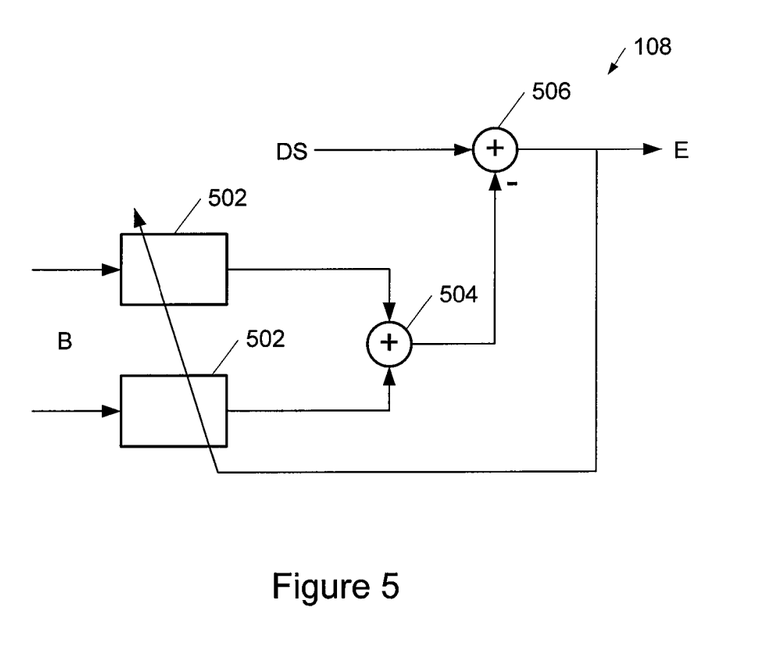
FIG. 5 is an interference canceller in the microphone processing system.

FIG. 5 is the interference canceller 108 in the microphone processing system 100. The interference canceller 108 generates the output signal E based on the intermediate signal DS and the interference signal B. Adaptive filters 502 may filter the interference signal B to minimize the interference signal B in the output signal E. The outputs of the adaptive filters 502 may be summed by an adder 504, and then subtracted by an adder 506 from the intermediate signal DS to produce the output signal E. The output signal E may substantially exclude the interference signal B from the intermediate signal DS.

The interference signals B may be filtered separately. The filters 502 may include finite impulse response filters, infinite impulse response filters, or other types of filters. The filtering may occur in the time domain or frequency domain. The signal selection of the adaptive filters 502 may be based on the output signal E when filtering the interference signal B. In alternative systems, the interference signal B is not filtered before being subtracted at the adder 506. The interference signal B may also be weighted to reduce its influence on the resulting output signal E.

Figure 6:
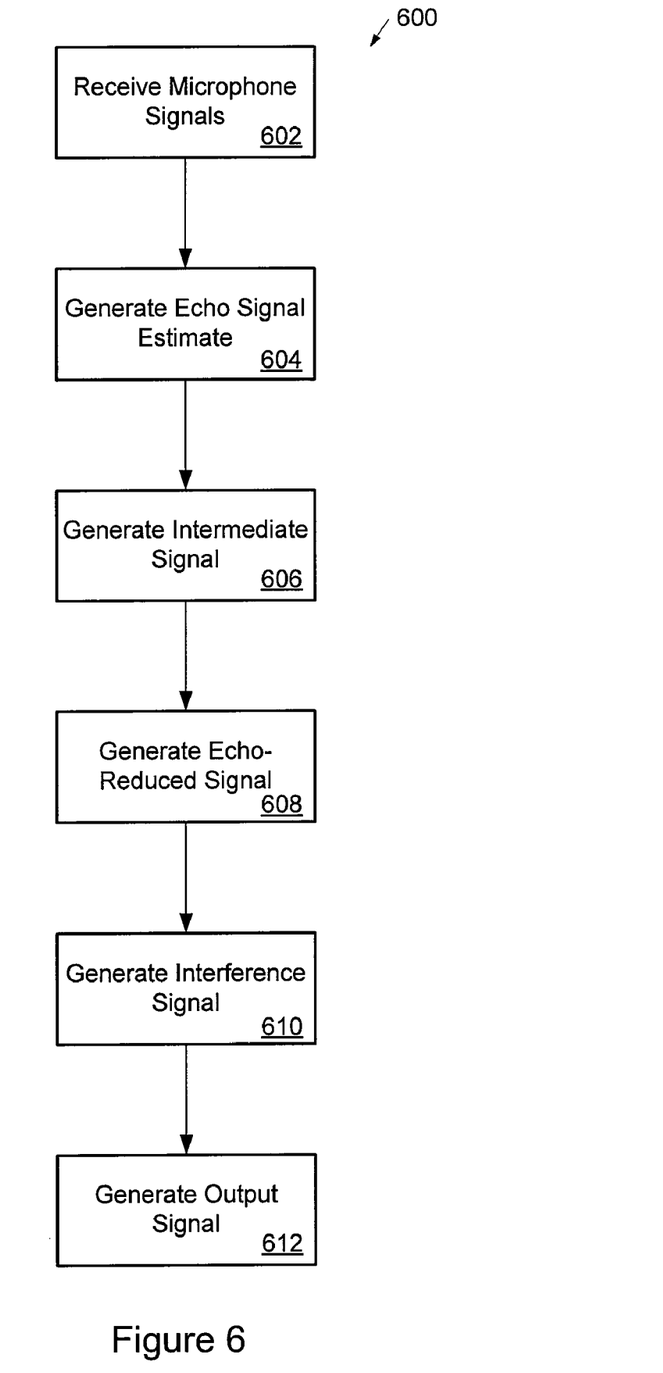
FIG. 6 is a method of processing microphone signals to generate a reduced interference output signal.

FIG. 6 is a method 600 of processing microphone signals to generate a reduced interference output signal. The method 600 processes received microphone signals and echo source signals to produce the reduced interference output signal. At Act 602, a plurality of microphone signals may be received. The microphone signals may be received by a plurality of microphones and the microphones may be arranged in an array to emphasize a particular sensitivity direction. The received microphone signals may include desired signal components and echo signal components. For example, the desired signal components may include a voice signal from a speaker, and the echo signal components may include sound emitted by loudspeakers in the environment of the microphones.

At Act 604, an echo signal estimate may be generated based on echo source signals. For example, the echo source signals may be the electrical or operational signals driving the loudspeakers that are known and used to generate the echo signal estimate. The echo source signals may be adaptively filtered and added to produce the echo signal estimate. At Act 606, an intermediate signal may be generated based on the received microphone signals. In particular, the received microphone signals may be delayed and summed to account for different distances between certain microphones and the source of a desired signal. The intermediate signal may be generated by a beamformer, for example. The intermediate signal may have an improved signal-to-noise ratio with respect to the desired signal, compared to the received microphone signals.

At Act 608, an echo-reduced signal may be generated based on the intermediate signal and the echo source signals. The echo signal estimate may be subtracted from the intermediate signal to produce the echo-reduced signal. The echo-reduced signal may have a further improved signal-to-noise ratio with respect to the desired signal, compared to the intermediate signal. At Act 610, the echo-reduced signal and the microphone signals may be processed to generate an interference signal. The echo-reduced signal is removed from the microphone signals to generate the interference signal. Because the echo-reduced signal substantially includes the desired signal, the interference signal may include substantially noise and echo components of the received microphone signals. The echo-reduced signal may be adaptively filtered and subtracted from the microphone signals to generate the interference signal.

At Act 612, the output signal may be generated based on the intermediate signal and the interference signal. The interference signal may be subtracted from the intermediate signal to produce the output signal. The output signal has reduced interference from noise and echo components. The noise and echo components in the interference signal are substantially removed from the intermediate signal, which may have an increased signal-to-noise ratio with respect to the desired signal.

Figure 7:
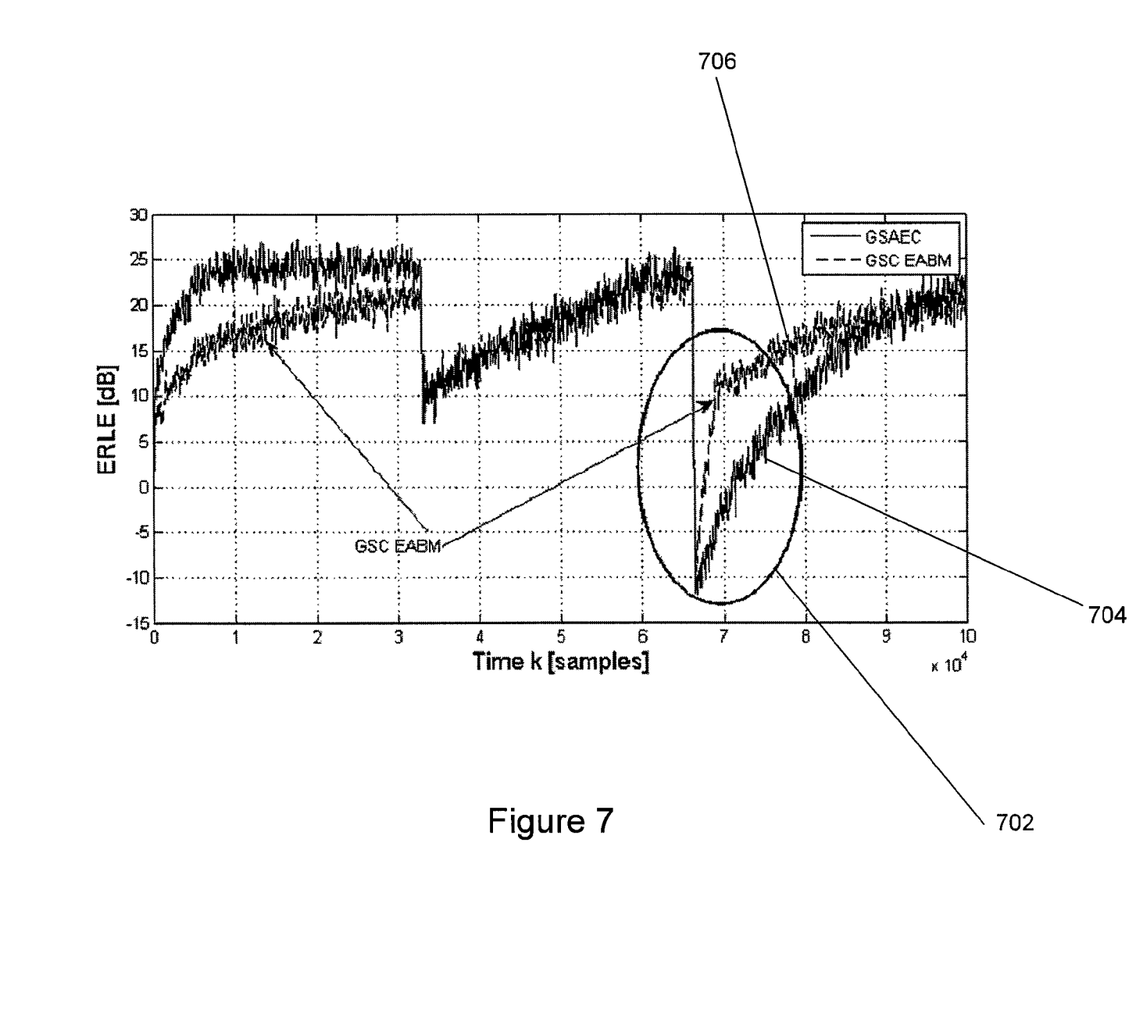
FIG. 7 is a plot of echo attenuation over time for the microphone processing system.

FIG. 7 is a plot of echo attenuation over time for the microphone processing system 100. The system 100 may adapt quickly to changes in the received microphone signals and the echo source signals. Adaptive filters used throughout the system 100 are able to track these changes to consistently and reliably produce output signals with reduced interference. One reason the system 100 may adapt quickly to changes is that the echo canceller 104 is not directly in the input path to the interference canceller 108. The echo canceller 104 contributes to the generation of the interference signal B, but does not affect the intermediate signal DS input to the interference canceller 108. The system 100 is more robust to fast changes in the received microphone signals and the echo source signals because the relatively slow echo canceller 104 does not directly affect the speed of the relatively faster interference canceller 108.

In FIG. 7, the vertical axis shows echo attenuation (ERLE) while the horizontal axis measures time. The echo attenuation measures how much the reproduction of the desired signal is disturbed by echo signals. A higher ERLE value means a smaller disturbance by the echo signals. The circled area 702 of the plot shows a range of time when the received microphone signals and the echo source signals have changed instantaneously. The bottom curve 704 shows the echo attenuation for a conventional microphone processing system, and the top curve 706 shows the echo attenuation for the microphone processing system 100. The plot 700 shows the echo attenuation when there is an instantaneous decrease of the echo source signal R from a loudspeaker 103 by 10 dB. The top curve 706 shows that the system 100 reacts and adapts more quickly to this instantaneous change to attenuate the changed echo signal, as compared to the bottom curve 704 for the conventional system, which takes a longer time to attenuate the changed echo signal.

Figure 8:
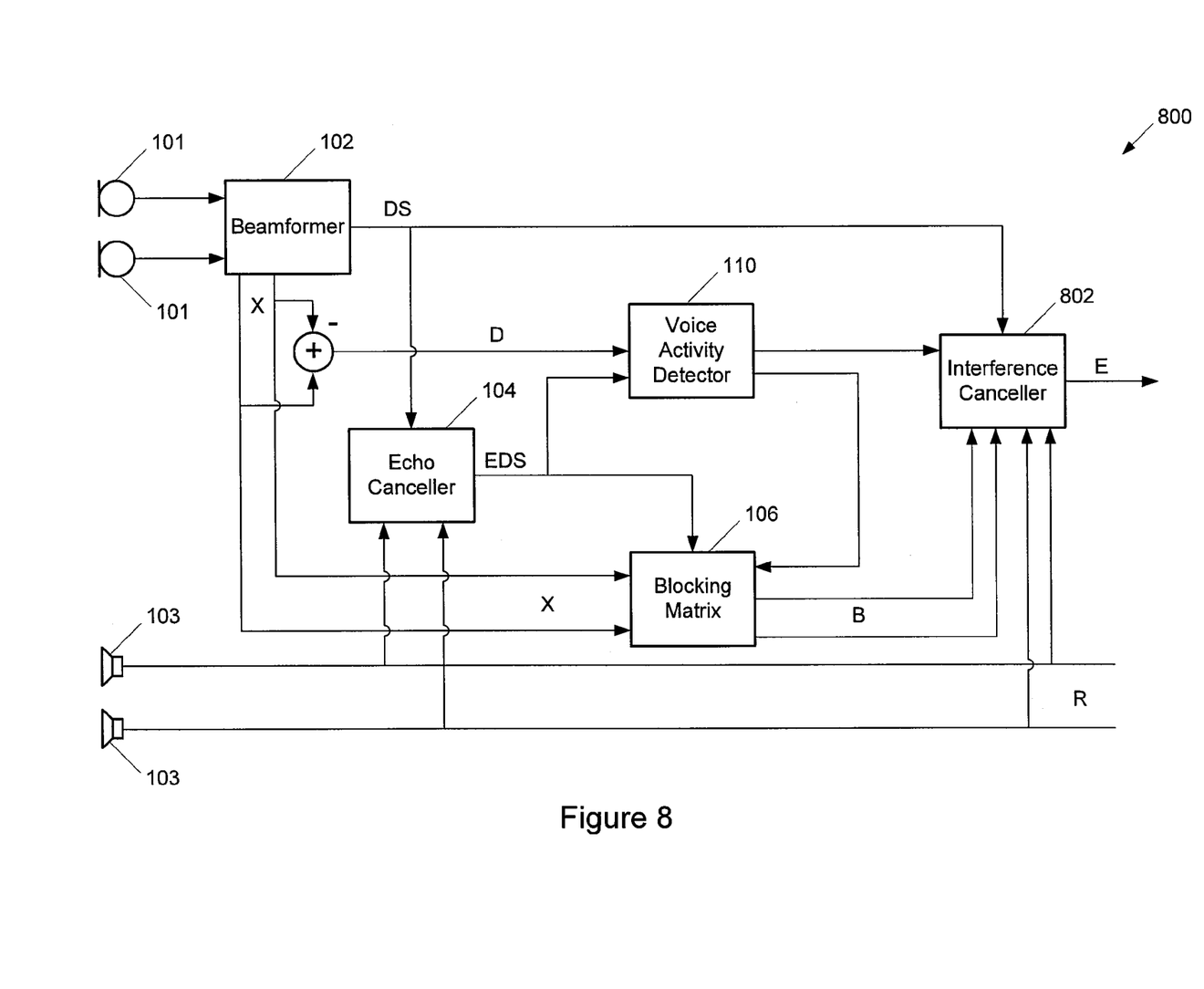
FIG. 8 is an alternative microphone processing system.

FIG. 8 is an alternative microphone processing system 800. The system 800 receives a plurality of microphone signals X and generates an output signal E with less interference than the microphone signals X. An echo-reduced signal EDS may be generated that subtracts an echo source signal R from the microphone signals X. The echo-reduced signal EDS may produce an interference signal B that is used to cancel the interference to produce an output signal E. The output signal E may have reduced interference due to the use of the echo-reduced signal EDS.

The system 800 includes the beamformer 102, echo canceller 104, blocking matrix 106, and voice activity detector 110. The system 800 also includes an interference canceller 802 that receives the intermediate signal DS, the interference signal B, and the echo source signal R to generate the output signal E. In the configuration of FIG. 8, the interference signal B and the echo source signal R are subtracted from the intermediate signal DS to produce the output signal E. The echo source signal R and interference signal B are simultaneously cancelled from the intermediate signal DS, which results in an enhanced microphone processing system that may remove more unwanted components.

Figure 9:
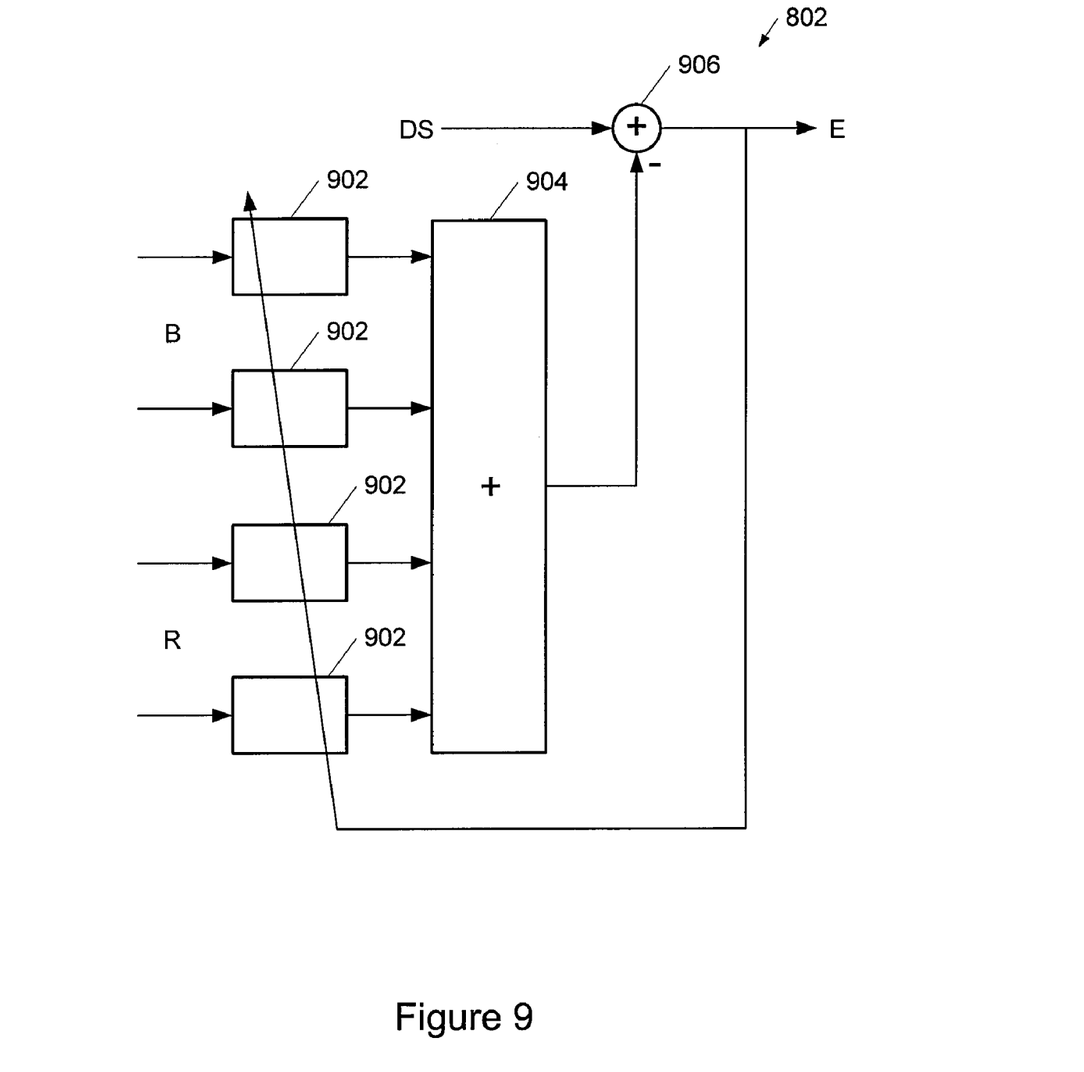
FIG. 9 is an interference canceller in the alternative microphone processing system.

FIG. 9 is the interference canceller 802 in the alternative microphone processing system 800. The interference canceller 802 generates the output signal E based on the intermediate signal DS, the interference signal B, and the echo source signal R. Adaptive filters 902 may filter the interference signal B and the echo source signal R to minimize their contribution to the output signal E. The outputs of the adaptive filters 902 may be summed together by an adder 904, and then subtracted by an adder 906 from the intermediate signal DS to produce the output signal E. The output signal E therefore substantially excludes the interference signal B and the echo source signal R from the intermediate signal DS.

Each of the interference signals B and the echo source signals R may be filtered separately. The filters 902 may include finite impulse response filters, infinite impulse response filters, or other types of filters. The filtering may take place in the time domain or frequency domain. The adaptive filters 902 may adapt its passband based on the output signal E when filtering the interference signal B and the echo source signal R. In other systems, the interference signal B and the echo source signal R is not filtered before being subtracted at the adder 906. The interference signal B and the echo source signal R may also be weighted to further reduce their influence on the resulting output signal E.

Each of the processes described may be encoded in a computer readable storage medium such as a memory, programmed within a device such as one or more integrated circuits, one or more processors or may be processed by a controller or a computer. If the processes are performed by software, the software may reside in a memory resident to or interfaced to a storage device, a communication interface, or non-volatile or volatile memory in communication with a transmitter. The memory may include an ordered listing of executable instructions for implementing logical functions. A logical function or any system element described may be implemented through optic circuitry, digital circuitry, through source code, through analog circuitry, or through an analog source, such as through an electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any device that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as code or an image or in another format (e.g., through an optical scan), then compiled, and/or interpreted or otherwise processed. The processed medium may then be stored in a computer and/or machine memory.

Although selected aspects, features, or components of the implementations are depicted as being stored in memories, all or part of the systems, including processes and/or instructions for performing processes, consistent with a system for processing microphone signal to provide an output signal with reduced interference may be stored on, distributed across, or read from other machine-readable media, for example, secondary storage devices such as distributed hard disks, floppy disks, and CD-ROMs; a signal received from a network; or other forms of ROM or RAM, some of which may be written to and read from within a vehicle component.

Specific components of a system for processing microphone signal to provide an output signal with reduced interference may include additional or different components. A controller may be implemented as a microprocessor, microcontroller, application specific integrated circuit (ASIC), discrete logic, or a combination of other types of circuits or logic. Similarly, memories may comprise DRAM, SRAM, or other types of memory. Parameters (e.g., conditions), databases, and other data structures that retain the data and/or programmed processes may be distributed across platforms or devices, separately stored and managed, may be incorporated into a single memory or database, or may be logically and physically organized in many different ways. Programs and instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A microphone processing system, comprising:
a beamformer configured to:
receive a plurality of microphone signals; and generate an intermediate signal based on at least one of the plurality of microphone signals, where the intermediate signal comprises a desired signal component and an echo signal component;

an echo canceller configured to:
receive the intermediate signal and an echo source signal; and
generate an echo-reduced signal based on the intermediate signal and the echo source signal;

a blocking matrix configured to:
receive the plurality of microphone signals and the echo-reduced signal; and
generate an interference signal based on the plurality of microphone signals and the echo-reduced signal; and an interference canceller configured to:
receive the intermediate signal and the interference signal; and
generate an output signal based on the intermediate signal and the interference signal, where the output signal comprises less interference than in the plurality of microphone signals.

2. The system of claim 1, where the echo source signal comprises a plurality of echo source signals, and where the echo canceller comprises:
a first adder that sums the plurality of echo source signals to generate an echo signal estimate; and
a second adder that subtracts the echo signal estimate from the intermediate signal to generate the echo-reduced signal.

3. The system of claim 2, where the echo canceller further comprises a plurality of echo source adaptive filters that filter the plurality of echo source signals to a plurality of filtered echo source signals, and where the first adder sums the plurality of filtered echo source signals to generate the echo signal estimate.

4. The system of claim 1, where each of the plurality of microphone signals is received from a plurality of microphones arranged as a microphone array.

5. The system of claim 1, where the beamformer is an adaptive beamformer.

6. The system of claim 1, where the blocking matrix comprises:
a echo-reduced adaptive filter that filters the echo-reduced signal to a filtered echo-reduced signal; and
a third adder that subtracts the filtered echo-reduced signal from each of the plurality of microphone signals to generate the interference signal.

7. The system of claim 1, where the interference canceller comprises:
an interference adaptive filter that filters the interference signal to a filtered interference signal; and
a fourth adder that subtracts the filtered interference signal from the intermediate signal to generate the output signal.

8. The system of claim 7, where the interference canceller is further configured to receive the echo source signal and generate the output signal based on the intermediate signal, the interference signal, and the echo source signal.

9. The system of claim 8, where the interference adaptive filter further filters the echo source signal to a filtered echo source signal, and the interference canceller further comprises a fifth adder that sums the filtered interference signal and the filtered echo source signal to generate a composite signal, where the fourth adder subtracts the composite signal from the intermediate signal to generate the output signal.

10. The system of claim 1, where each of the plurality of microphone signals comprises a desired signal component and an echo signal component.

11. The system of claim 1, further comprising:
a sixth adder that subtracts one of the plurality of microphone signals from another of the plurality of microphone signals to generate a noise component estimate of the plurality of microphone signals; and
a voice activity detector configured to:
receive the noise component estimate and the echo-reduced signal; and control activation of one or more of the beamformer, the echo canceller, the blocking matrix, or the interference canceller based on the noise component estimate, and the echo-reduced signal.

12. The system of claim 11, where the voice activity detector comprises a divider that divides a signal power of the echo-reduced signal by a signal power of the noise component estimate to generate a quotient, and where activation is controlled if the desired signal component is detected when the quotient is greater than a predetermined value.

13. A method of processing a plurality of microphone signals, comprising:
receiving a plurality of microphone signals;
receiving an echo source signal;
generating an intermediate signal based on at least one of the plurality of microphone signals, where the intermediate signal comprises a desired signal component and an echo signal component;
generating an echo-reduced signal based on the intermediate signal and the echo source signal;
generating an interference signal based on the plurality of microphone signals and the echo-reduced signal; and
generating an output signal based on the intermediate signal and the interference signal, where the output signal comprises less interference than in the plurality of microphone signals.

14. The method of claim 13, where the echo source signal comprises a plurality of echo source signals, and generating the echo-reduced signal comprises:
adding the plurality of echo source signals to generate an echo signal estimate; and
subtracting the echo signal estimate from the intermediate signal to generate the echo-reduced signal.

15. The method of claim 14, where:
generating the echo-reduced signal further comprises adaptively filtering the plurality of echo source signals to a plurality of filtered echo source signals; and
adding the plurality of echo source signals comprises adding the plurality of filtered echo source signals to generate the echo signal estimate.

16. The method of claim 13, where generating the interference signal comprises: adaptively filtering the echo-reduced signal to a filtered echo-reduced signal; and subtracting the filtered echo-reduced signal from each of the plurality of microphone signals to generate the interference signal.

17. The method of claim 13, where generating the output signal comprises:
adaptively filtering the interference signal to a filtered interference signal; and
subtracting the filtered interference signal from the intermediate signal to generate the output signal.

18. The method of claim 17, further comprising generating the output signal based on the intermediate signal, the interference signal, and the echo source signal.

19. The method of claim 18, where generating the output signal based on the intermediate signal, the interference signal, and the echo source signal comprises:

adaptively filtering the echo source signal to a filtered echo source signal;

adding the filtered interference signal and the filtered echo source signal to generate a composite signal; and subtracting the composite signal from the intermediate signal to generate the output signal.

20. The method of claim 13, where each of the plurality of microphone signals comprises a desired signal component and an echo signal component.

21. The method of claim 13, further comprising:

subtracting one of the plurality of microphone signals from another of the plurality of microphone signals to generate a difference signal that is a noise component estimate of the plurality of microphone signals;

comparing the noise component estimate with the echo-reduced signal to determine a presence of the desired signal component; and controlling activation of one or more of the generating the intermediate signal, generating the echo-reduced signal, generating the interference signal, and generating the output signal steps based on the presence of the desired signal component.

22. The method of claim 21, where:

comparing comprises dividing a signal power of the echo-reduced signal by a signal power of the noise component estimate to generate a quotient; and the desired signal component is present if the quotient is greater than a predetermined value.

23. A microphone processing system, comprising:

a beamformer configured to:

receive a plurality of microphone signals; and generate an intermediate signal based on at least one of the plurality of microphone signals, where the intermediate signal comprises a desired signal component and an echo signal component;

an echo canceller configured to:

receive the intermediate signal and an echo source signal; and generate an echo-reduced signal based on the intermediate signal and the echo source signal;

a blocking matrix configured to:

receive the plurality of microphone signals and the echo-reduced signal; and generate an interference signal based on the plurality of microphone signals and the echo-reduced signal;

an interference canceller configured to:

receive the intermediate signal and the interference signal; and generate an output signal based on the intermediate signal and the interference signal, where the output signal comprises less interference than in the plurality of microphone signals; and a voice activity detector configured to:

receive a difference signal based on the plurality of microphone signals and the echo-reduced signal; and control activation of one or more of the beamformer, the echo canceller, the blocking matrix, or the interference canceller based on a noise component estimate of the microphone signals and the echo-reduced signal.

* * * * *